United States Patent
Tian et al.

(10) Patent No.: US 8,266,635 B2
(45) Date of Patent: Sep. 11, 2012

(54) BROWSER-BASED USER INTERFACE AND CONTROL ARCHITECTURE WITH PRIORITY ATTRIBUTES

(75) Inventors: Yong Tian, Cupertino, CA (US); Brian Chin, Alameda, CA (US)

(73) Assignee: Access Co., Ltd., Tokyo (JP)

( * ) Notice: Subject to any disclaimer, the term of this patent is extended or adjusted under 35 U.S.C. 154(b) by 1038 days.

(21) Appl. No.: 12/004,663

(22) Filed: Dec. 20, 2007

(65) Prior Publication Data

US 2009/0165023 A1      Jun. 25, 2009

(51) Int. Cl.
G06F 9/44    (2006.01)
G06F 13/14   (2006.01)

(52) U.S. Cl. ........................... 719/318; 710/240
(58) Field of Classification Search ............... 719/318
See application file for complete search history.

(56) References Cited

U.S. PATENT DOCUMENTS

| | | | |
|---|---|---|---|
| 6,154,646 A | 11/2000 | Tran et al. | |
| 6,173,316 B1 | 1/2001 | De Boor et al. | |
| 6,317,781 B1 | 11/2001 | De Boor et al. | |
| 6,385,644 B1 | 5/2002 | Devine et al. | |
| 6,445,776 B1 * | 9/2002 | Shank et al. | 379/88.1 |
| 6,470,381 B2 | 10/2002 | De Boor et al. | |
| 6,509,913 B2 | 1/2003 | Martin, Jr. et al. | |
| 6,675,204 B2 | 1/2004 | De Boor et al. | |
| 7,076,275 B1 | 7/2006 | Karstens et al. | |
| 7,428,723 B2 | 9/2008 | Greene et al. | |
| 7,519,687 B2 * | 4/2009 | Tsuda et al. | 709/219 |
| 7,721,032 B2 * | 5/2010 | Bushell et al. | 710/240 |
| 2004/0023646 A1 * | 2/2004 | Inami et al. | 455/418 |
| 2006/0026526 A1 | 2/2006 | Simister et al. | |
| 2007/0286381 A1 * | 12/2007 | Abramson et al. | 379/201.01 |
| 2009/0144756 A1 * | 6/2009 | Inami | 719/318 |

OTHER PUBLICATIONS

International Search Report and Written Opinion mailed Feb. 20, 2009, for PCT Application No. PCT/US08/87543 filed Dec. 18, 2008, 9 pages.
International Preliminary Report on Patentability and Written Opinion received for PCT Patent Application No. PCT/US2008/087543, mailed on Jul. 1, 2010, 7 pages.

\* cited by examiner

*Primary Examiner* — Andy Ho
*Assistant Examiner* — Abdou Seye
(74) *Attorney, Agent, or Firm* — Morrison & Foerster LLP

(57) ABSTRACT

A browser-enabled device includes a browser-based user interface and control architecture, which has a browser core, a browser framework, and a user interface. The user interface is written using a markup language. In processing event registrations, the browser framework receives an event registration. The received event registration having a response unique resource identifier (URI) content and a priority field. The priority field of the received event registration is examined to determine priority of the received event registration. If the browser core is loading the response URI content of a prior event registration and if the priority of the received event registration is higher than the priority of the prior event registration, then the loading of the response URI content of the prior event registration is halted, and loading of the response URI content of the received event registration is begun.

19 Claims, 2 Drawing Sheets

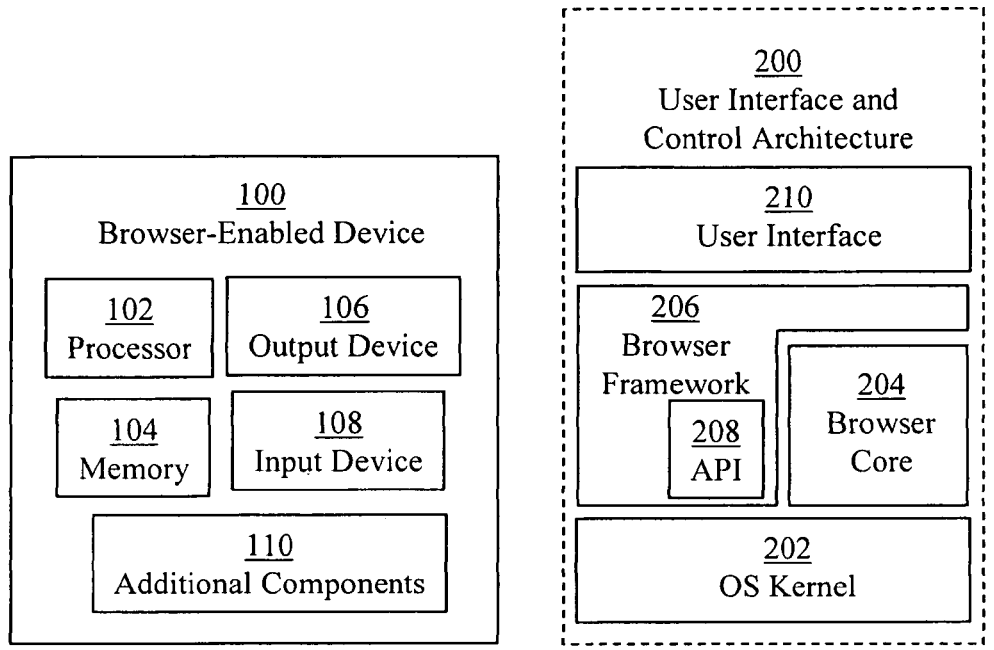
FIG. 1
FIG. 2
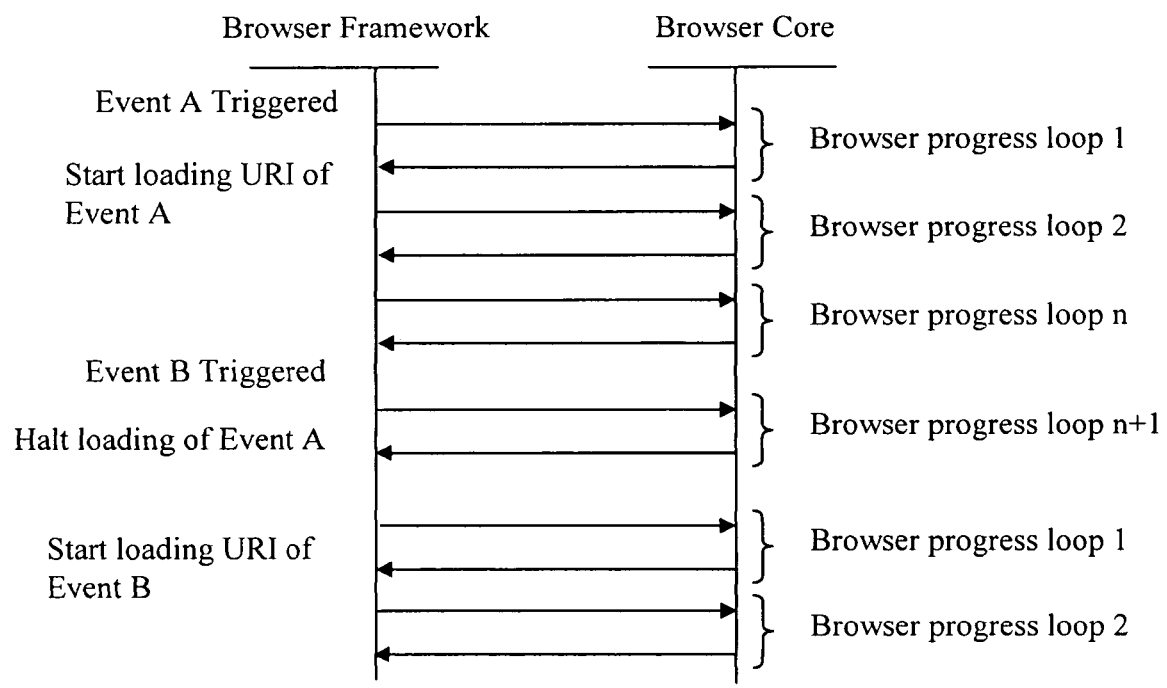
FIG. 3

BROWSER-BASED USER INTERFACE AND CONTROL ARCHITECTURE WITH PRIORITY ATTRIBUTES

BACKGROUND

1. Field

The present application generally relates to browser-enabled devices, and, more particularly, to browser-enabled devices having browser-based user interface and control architectures with priority attributes.

2. Related Art

An ever increasing number of electronic devices (e.g., mobile phones, handhelds, home appliances, set top boxes, etc.) include browser software. In some of these browser-enabled devices, the user interface and control architecture is implemented using the browser software (i.e., a browser-based interface and control architecture) rather than a full-function operating system (O/S).

The user interface portion of the browser-based interface and control architecture can be written using a markup language (e.g., hypertext markup language (HTML), Javascript, etc.), which can be faster to write and more flexible than if written using C/C++, as an example. However, markup languages typically do not support prioritization of events.

For example, if a mobile phone has a browser-based interface and control architecture and the user interface portion is written using HTML, then the browser-based interface and control architecture may not be able to interrupt an event that is currently being performed (e.g., the downloading of a page) to perform an event with a higher priority (e.g., an incoming call). Thus, in this example, the user of the mobile phone may not be informed about the incoming call until the downloading of the page is completed. This may result in the incoming call going unanswered, which may be undesirable.

With regard to mobile phones that support both telephony and browsing functions, one conventional approach to allowing for an incoming call to halt the downloading of a page is to perform the telephony and browsing functions on separate threads (one thread for telephony functions and another thread for browsing functions). This (running multiple threads) requires the use of a full-function OS. It may be undesirable, however, to use a full-function OS in some circumstances. For example, it may be desirable for a browser-enabled device to use a less powerful processor and less memory than are typically required to support a full-function OS. Additionally, it may be desirable to run only a single thread because of simplified programming model.

SUMMARY

In one exemplary embodiment, a browser-enabled device includes a browser-based user interface and control architecture, which has a browser core, a browser framework, and a user interface. The user interface is written using a markup language. In processing event registrations, the browser framework receives an event registration. The received event registration having a response unique resource identifier (URI) content and a priority field. The priority field of the received event registration is examined to determine priority of the received event registration. If the browser core is loading the response URI content of a prior event registration and if the priority of the received event registration is higher than the priority of the prior event registration, then the loading of the response URI content of the prior event registration is halted, and loading of the response URI content of the received event registration is begun.

BRIEF DESCRIPTION OF THE DRAWINGS

FIG. 1 is a block diagram of an exemplary browser-enabled device;

FIG. 2 is a block diagram of an exemplary browser-based user interface and control architecture of the exemplary browser-enabled device of FIG. 1;

FIG. 3 is a sequence diagram illustrating the handling of two event registrations by an exemplary browser framework and an exemplary browser core of the exemplary browser-based user interface and control architecture of FIG. 2.

DETAILED DESCRIPTION

Figure 4:
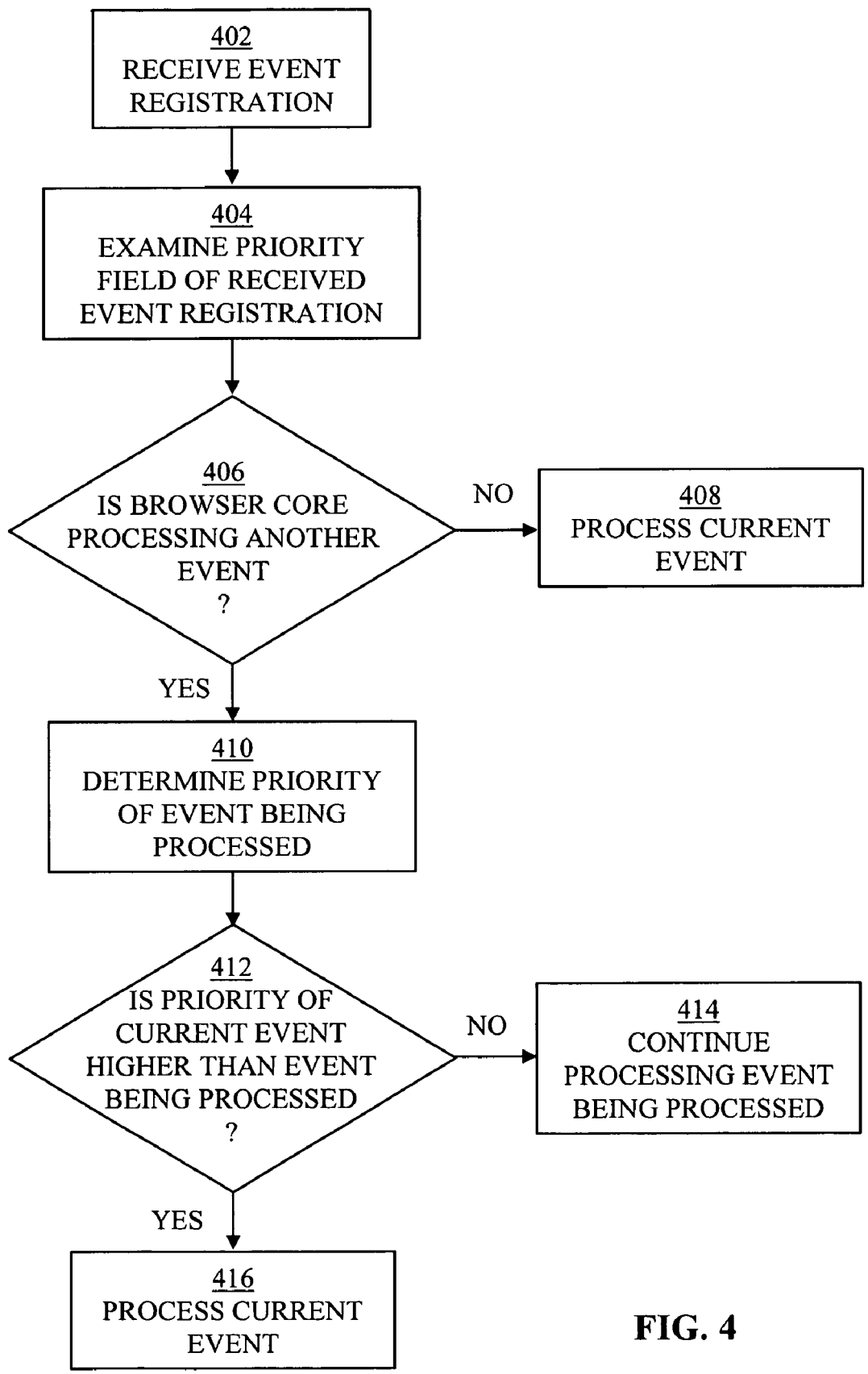
FIG. 4 is a flow diagram illustrating an exemplary process of handling event registrations.

The following description sets forth numerous specific configurations, parameters and the like. It should be recognized, however, that such description is not intended as a limitation on the scope of the present invention, but is instead provided as a description of exemplary embodiments.

FIG. 1 depicts an exemplary embodiment of a browser-enabled device 100. As described above, browser-enabled device 100 can be various types of devices, including mobile phones, handhelds, home appliances, set top boxes, etc. It should be recognized that browser-enabled device 100 can support any number of functions in addition to browsing functions. For example, if browser-enabled device 100 is a mobile phone, then browser-enable device 100 supports telephony and browsing functions, including Voice-over-IP (VoIP) functions.

As depicted in FIG. 1, browser-enabled device 100 can include a processor 102, memory 104, output device 106, and input device 108. Processor 102 can be configured to perform the steps of the processes described below. Memory 104 can include various types of memories, including ROM, RAM, flash, etc. Output device 106 can include a display to provide output to a user. Input device 108 can include buttons, a full keyboard, and the like to receive input from the user. It should be recognized that output device 106 and input device 108 can be integrated. For example, a touch-screen can be used both as an output device and as an input device.

It should be recognized that browser-enabled device 100 can include any number of additional components 110 depending on the functions supported on browser-enabled device 100. For example, returning to the example of browser-enabled device 100 being a mobile phone, additional components 110 of browser-enabled device 100 can include various telephony components, such as a speaker and microphone, to support the telephony functions.

As described above, browser-enabled device 100 can include a user interface and control architecture that is implemented using browser software (i.e., a browser-based user interface and control architecture). FIG. 2 depicts an exemplary browser-based user interface and control architecture 200. Browser-based user interface and control architecture 200 can be stored in memory 104 (FIG. 1) and executed by processor 102 (FIG. 1). Browser-based user interface and control architecture 200 can receive input from a user through input device 108 (FIG. 1) and provide output to a user through output device 106 (FIG. 1).

In the present exemplary embodiment, browser-based user interface and control architecture 200 includes an OS kernel 202, a browser core 204, a browser framework 206, and a user interface 210. It should be recognized that browser-based user interface and control architecture 200 can include any number of additional components.

OS kernel 202 and browser core 204 can be written in any desirable device native code. As described above, user interface 210, however, can be written using a markup language, such as HTML, Javascript, etc. For information on a markup language based man-machine interface, see U.S. Pat. No. 6,173,316, which is incorporated herein by reference in its entirety for all purposes.

In the present exemplary embodiment, OS kernel 202 is not a full-function OS. Thus, OS kernel 202 possesses limited capabilities in comparison to a full-function OS. For example, OS kernel 202 is capable of running only a single thread in contrast to a full-function OS that can run multiple threads. The limited capabilities of OS kernel 202 permit browser-enabled device 100 (FIG. 1) to operate with a less powerful processor and less memory than if a full-function OS was used. Additionally, it may be desirable to run only a single thread because of simplified programming model. OS kernel 202, however, does possess, at a minimum, input and output functions, a file system, and network capabilities.

Browser core 204 can include extensions or plug-ins to map native OS commands to the markup language used to write user interface 210 of browser-based user interface and control architecture 200. Browser framework 206 controls the event loops and calls on browser core 204 periodically to process incoming events. The source code for user interface 210 can be stored as a file on browser enabled device 100 (FIG. 1), online, or generated in, by, or on a web server.

In the present exemplary embodiment, browser-based user interface and control architecture 200 is configured to have priority attributes (i.e., events are handled using a priority-based system). In particular, as depicted in FIG. 2, browser framework 206 includes an application programming interface (API) 208 to register events. The events are registered with a priority level and uniform resource identifier (URI), which can include a uniform resource location and/or uniform resource name (URL/URN) to load responses to the events.

For example, an exemplary event registration is depicted below for an event (EventType evt) with a priority field (UInt priority) and URI field (String uri):

EventRegistration(EventType evt, UInt priority, String uri)

It should be recognized that the above example is merely exemplary. The format of the event registration can be different depending on the particulars of the programming language used to implement the browser-based user interface and control architecture.

It should also be recognized that the event registration can include any number of additional fields and/or parameters. For example, the following exemplary event registration includes a timeout parameter (UInt timeout):

EventRegistration(EventType evt, UInt priority, UInt timeout, String uri)

The timeout parameter can be used for a transient event. For example, if the event is placed in a queue and not handled with the specified timeout period, then the event is ignored and removed from the queue.

If an event is triggered, browser framework 206 calls on browser core 204 to load the response URI content of the event. If a subsequent event is triggered while the response URI content of an earlier event is still being loaded, then browser framework 206 checks the priority levels of the two events. If the subsequent event has a higher priority than the earlier event, then browser framework 206 calls on browser core 204 to halt the loading of the response URI content of the earlier event and start to load the response URI content of the subsequent event. If the subsequent event does not have a higher priority than the earlier event, then the URI content of the earlier event will continue to load.

For example, FIG. 3 depicts an event A that has been triggered, which causes the URI content of event A to load (browser progress loops 1, 2, n). Before loading is completed, event B triggers. The browser framework checks the priority levels of events A and B. If event B has a higher priority than event A, then the browser framework calls on the browser core to halt the loading of the response URI content of event A (browser progress loop n+1) and start to load the response URI content of event B (browser progress loops 1 and 2). If event B does not have a higher priority than event A, then the URI content of event A will continue to load.

FIG. 4 depicts an exemplary process 400 of handling event registrations. Process 400 can be performed by processor 102 (FIG. 1).

In step 402, an event registration is received by the browser framework. As noted above, the event registration includes a priority field. In step 404, the priority field in the event registration is examined by the browser framework.

In step 406, the browser framework determines if the browser core is processing another event. If there is no other event being processed, then the current event is processed on the browser core in step 408. If there is another event being processed, the browser framework determines the priority of the event being processed in step 410.

In step 412, the browser framework compares the priority of the current event to the priority of the event being processed. If the priority of the current event is higher than the priority of the event being processed, then the current event is processed in step 416. In particular, the browser framework directs the browser core to halt the loading of the response URI content of the event being processed and begin to load the response URI content of the current event. If the priority of the current event is not higher (i.e., lower or the same) than the priority of the event being processed, then the event being processed continues to be processed in step 414.

In one exemplary embodiment, the various events to be processed by the browser core are assigned priorities in advance. In particular, all events to be processed by the browser core are defined in advance, such as when the browser framework is being written. Priorities are then assigned to the events. The assignment of priorities to events can be stored in various formats, such as a table.

For example, assume again that browser-enabled device 100 (FIG. 1) is a mobile phone having telephony functions in addition to browsing functions. It is desirable for all browsing activity to be ceased when an incoming call is received. Thus, an incoming call event can be assigned the highest priority (e.g., priority 1), while all browsing related events are assigned a lesser priority (e.g., priority 2 and below).

In one exemplary embodiment, event registrations can be queued before being processed. The browser framework processes the event registrations from the queue based on their priorities. In particular, the event priority in the queue with the highest priority is the first event priority to be processed from the queue. The queue can be stored in memory or any other desirable location. It should be recognized that the queue can be managed according to various known techniques.

Although only certain exemplary embodiments of this invention have been described in detail above, those skilled in the art will readily appreciate that many modifications are possible in the exemplary embodiments without materially departing from the novel teachings and advantages of this invention. For example, aspects of embodiments disclosed above can be combined in other combinations to form additional embodiments. Accordingly, all such modifications are intended to be included within the scope of this invention.

We claim:

1. A method of processing event registrations in a browser-based user interface and control architecture of a browser-enabled device, the browser-based user interface and control architecture having a browser core, a browser framework, and a user interface, the user interface being written using a markup language, the method comprising:
   defining events to be processed by the browser core;
   assigning priorities to the defined events, wherein the defined events include:
      a first set of events associated with telephony functions; and
      a second set of events associated with browsing functions;
   receiving an event registration, the received event registration having a response unique resource identifier (URI) content and a priority field, the event registration being received by the browser framework;
   examining the priority field of the received event registration to determine priority of the received event registration;
   if the browser core is loading the response URI content of a prior event registration, then determining if the priority of the received event registration is higher than the priority of the prior event registration; and
   if the priority of the received event registration is higher than the priority of the prior event registration, then halting the loading of the response URI content of the prior event registration and starting to load the response URI content of the received event registration.

2. The method of claim 1, further comprising:
   if the priority of the received event registration is not higher than the priority of the prior event registration, then continuing to load the response URI content of the prior event registration.

3. The method of claim 1, further comprising:
   queuing event registrations in a queue; and
   processing event registrations from the queue based on the priorities of the event registrations.

4. The method of claim 1, wherein the event registrations in the queue include timeout parameters, and further comprising:
   removing event registrations from the queue based on the timeout parameters of the event registrations.

5. The method of claim 1, wherein defining events includes defining all events to be processed by the browser core.

6. The method of claim 5, wherein one of the first set of events is an incoming call event, wherein the incoming call event is assigned the highest priority.

7. The method of claim 1, wherein the browser-based user interface and control architecture includes an operating system kernel capable of running only one thread at a time.

8. The method of claim 1, wherein the steps of receiving, examining, determining, and halting are performed by an application programming interface of the browser framework.

9. The method of claim 1, wherein the prior event is related to a browsing function, and wherein the current event is an incoming call event.

10. A non-transitory computer-readable storage medium having computer-executable instructions for processing event registrations in a browser-based user interface and control architecture of a browser-enabled device, the browser-based user interface and control architecture having a browser core, a browser framework, and a user interface, the user interface being written using a markup language, comprising instructions for:
   defining events to be processed by the browser core;
   assigning priorities to the defined events, wherein the defined events include:
      a first set of events associated with telephony functions; and
      a second set of events associated with browsing functions;
   receiving an event registration, the received event registration having a response unique resource identifier (URI) content and a priority field, the event registration being received by the browser framework;
   examining the priority field of the received event registration to determine priority of the received event registration;
   if the browser core is loading the response URI content of a prior event registration, then determining if the priority of the received event registration is higher than the priority of the prior event registration; and
   if the priority of the received event registration is higher than the priority of the prior event registration, then halting the loading of the response URI content of the prior event registration and starting to load the response URI content of the received event registration.

11. The computer-readable storage medium of claim 10, further comprising instructions for:
   if the priority of the received event registration is not higher than the priority of the prior event registration, then continuing to load the response URI content of the prior event registration.

12. The computer-readable storage medium of claim 10, further comprising instructions for:
   queuing event registrations in a queue; and
   processing event registrations from the queue based on the priorities of the event registrations.

13. The computer-readable storage medium of claim 10, wherein the browser-based user interface and control architecture includes an operating system kernel capable of running only one thread at a time.

14. A browser-enabled device, comprising:
   a processor;
   memory; and
   a browser-based user interface and control architecture comprising
      an operating system kernel;
      a browser core;
      a user interface written using the markup language
      a browser framework, the browser framework having an application programming interface (API) configured to:
         defining events to be processed by the browser core;
         assigning priorities to the defined events, wherein the defined events include:
            a first set of events associated with telephony functions; and
            a second set of events associated with browsing functions;
         receive an event registration, the event registration having a response unique resource identifier (URI) content and a priority field;
         examine the priority field of the event registration to determine priority of the received event registration;
         if the browser core is loading the response URI content of a prior event registration, then determine if the priority of the received event registration is higher than the priority of the prior event registration; and
         if the priority of the received event registration is higher than the priority of the prior event registration, then halt loading of the response URI content of the prior event registration and start loading the response URI content of the received event registration.

15. The browser-enabled device of claim 14, further comprising:
a queue configured to store event registrations, wherein the API is configured to process event registrations from the queue based on the priorities of the event registrations.

16. The browser-enabled device of claim 14, further comprising:
a table having an assignment of priorities to events to be processed by the browser framework.

17. The browser-enabled device of claim 16, wherein an incoming call event is assigned the highest priority.

18. The browser-enabled device of claim 14, wherein the operating system kernel is capable of running only one thread at a time.

19. The browser-enabled device of claim 14, further comprising:
telephony components, wherein the event of the prior event registration is related to a browsing function, and wherein the event of the received event registration is an incoming call event.

* * * * *